United States Patent [19]

Eller

[11] 4,167,292

[45] Sep. 11, 1979

[54] METHOD OF USING A LOW TEMPERATURE FREEZING SOFTENING AND ABRASION FLUID

[76] Inventor: Saul A. Eller, 17-41 166th St., Whitestone, N.Y. 11357

[21] Appl. No.: 853,839

[22] Filed: Nov. 22, 1977

[51] Int. Cl.² .................. E21C 37/06; E21C 41/10
[52] U.S. Cl. .......................................... 299/7; 299/17
[58] Field of Search ................ 166/55, 222, 223, 297, 166/298, 307; 175/67; 299/7, 16, 17

[56] References Cited

U.S. PATENT DOCUMENTS

| | | | |
|---|---|---|---|
| 172,157 | 1/1876 | O'Farrell | 299/17 |
| 1,418,098 | 5/1922 | Schneiders | 299/17 X |
| 1,935,643 | 11/1933 | Laughlin | 299/17 X |
| 2,063,761 | 12/1936 | Scholz | 299/17 X |
| 3,081,828 | 3/1963 | Quick | 175/67 |
| 3,375,886 | 4/1968 | Goodwin et al. | 175/67 X |
| 3,529,868 | 9/1970 | Hogg | 299/7 |
| 3,554,602 | 1/1971 | Chaney | 299/17 |
| 3,874,733 | 4/1975 | Poundstone et al. | 299/17 |
| 3,934,935 | 1/1976 | Lambly et al. | 299/16 X |
| 3,951,457 | 4/1976 | Redford | 299/17 X |
| 3,957,308 | 5/1976 | Lambly et al. | 299/17 X |
| 4,046,197 | 9/1977 | Gruesbeck, Jr. et al. | 166/297 X |

*Primary Examiner*—Stephen J. Novosad
*Assistant Examiner*—George A. Suchfield

[57] ABSTRACT

A low temperature freezing fluid and method are used for year-round wearing away of bitumen deposits, such as those of the Athabaska Tar Sands, by a softening and/or abrasion process. Relatively small size particles of bitumen and its associated foreign matter are produced which enable separation of bitumen at greater speed, efficiency and thoroughness than present methods. Water solutions of calcium chloride having a freezing point down to −46° F. and a specific gravity greater than that of bitumen are used as the fluid. Since bitumen deposits vary considerably in physical properties; optimum softening and/or abrasion efficiency and reduced particle size are achieved by either heating the fluid to 212° F. to soften or refrigerating it to −46° F. to harden the bitumen prior to spraying it at high velocity onto the deposit. At times, faster rates of softening and/or abrasion and reduced particle size are achieved by incorporating abrasion particles in the fluid. The fluid conveys bitumen, foreign matter and abrasion particles to a pool from which they are pumped to on site conditioning and separation tanks. After separation into components, bitumen and fluid are combined and pumped to a refinery wherein they are separated and bitumen upgraded to synthetic crude oil. The foreign matter and abrasion particles are pumped together with fluid to either an on site tailings pond or to recycle equipment. The fluid is recycled.

8 Claims, 1 Drawing Figure

METHOD OF USING A LOW TEMPERATURE FREEZING SOFTENING AND ABRASION FLUID

BACKGROUND OF THE INVENTION

1. Field of the Invention

This invention relates to the field of mining and/or extraction of bitumen or heavy oil deposits which are found in nature associated with foreign matter, such as sand particles, various types of stone and clay.

A related field is that of the wearing away of materials into relatively small particles by a softening and/or abrasion process using a low temperature freezing fluid which may contain abrasion particles to accelerate the process.

2. Description of Prior Art

Bitumen (heavy oil) deposits from which synthetic crude oil can be formed occur in nature in deposits which contain bitumen associated with foreign matter; such as sand particles, various types of stone and clay. An example of such a deposit which is currently being exploited commercially is that of the Athabaska tar sands located in Alberta, Canada.

Information regarding a description of this deposit, current procedures used in extracting the tar sands, delivering them to a refinery, separating bitumen from foreign matter and then upgrading bitumen into synthetic crude oil is contained in the Autumn 1967 issue of OUR SUN, magazine of the Sun Company. Used with permission of the Sun Company.

As noted in the above magazine, the Athabaska tar sands constitute one of the world's largest single energy resource and are believed to contain over 600 billion barrels of synthetic crude oil of which it is estimated half can be recovered through existing techniques of production.

The current procedures used in extracting the tar sands, delivering them to a refinery and then separating bitumen from foreign matter have a number of significant problems that this invention is designed to overcome. For example, the prior art employs giant excavators equipped with rotating bucketwheels to extract the tar sands from the deposit. The digging wheel on an excavator (there are two of them) has ten buckets, each bucket equipped with teeth and capable of biting out and holding nearly two tons of sand. Some of the problems encountered using current procedures are described in a newspaper article titled "The Oil is Synthetic, but the Problems are Real," Oct. 12, 1975. Bus. and Fin. Sect. "Copyright 1975 by The New York Times Company. Reprinted by permission" wherein it is stated "A major part of the problem is the changing nature of the oil sands, which are impossible to stockpile. In summer, they are like an asphalt road mix and in the early days they wore out bucketwheel teeth in four hours. In winter, at 50 degrees below zero, the tar sands are hard as carborundum, and the bucketwheel teeth have glowed red in frustration. The tar sands rip conveyor belts, corrode process units and make vehicle maintenance a nightmare". Because of the above-noted problems, the theoretical capacity of a bucketwheel excavator for extracting tar sands is reduced from a theoretical maximum of 215,000 tons a day to an average of 108,000 tons a day.

Another disadvantageous feature of the prior art is that separation of bitumen from foreign matter does not occur at the deposit (on site). Instead, the tar sands, as extracted, are transported by conveyor belts to the refinery, despite the fact as noted in the above-mentioned magazine that from about 42.5 million tons of tar sands only perhaps 21 million barrels of bitumen will be recovered. The remaining materials transported to the refinery at considerable expense must now be transported again from the refinery to a tailings pond where they are discarded.

Additionally, the problem concerning ripping of conveyor belts noted in the above-mentioned article will get worse in time as the distance from the deposit being worked recedes from the refinery and either longer or additional conveyor belts are required.

Furthermore, additional problems are encountered using the present method in separating bitumen from its foreign matter at the refinery and in obtaining maximum recovery of bitumen. As described in the above-mentioned magazine published by the Sun Company, at the refinery the tar sands are supplied first to one of a number of conditioning drums. While the drum rotates slowly, water heated to a temperature of about 190° F. and steam are added, mixing bitumen, sand, water and steam into a pulp. From the drum, pulp is piped to one of a number of double-walled separation tanks. Here, bitumen extracted from the sand rises to the surface as a froth and is swept between the inner and outer walls to be collected.

Sand and water fall to the bottom of the separation tank and are piped to the tailings pond. There is no sharp dividing line between the frothy bitumen and the pulp below. Between the froth on top and the sand and water on bottom are the "middlings", containing clay, bitumen and water. Middlings are pumped to scavenger cells where air is forced in, causing the remaining bitumen to froth to the surface. Again froth is recovered, while sand and water ae pumped to scavenger cells where the same process recurs. Between them, separation and scavenger cells allow the extraction plant to recover up to 90 percent of the bitumen from the sand.

The above-noted difficulties in separation and recovery of bitumen and the apparently involved, time consuming, elaborate equipment required to effect this separation and recovery are attributed by the inventor to the following.

a. The relatively large chunks of tar sands extracted from the deposit by the bucketwheel teeth and supplied to a conditioning drum.

b. The difficulty within a conditioning drum is breaking down these relatively large chunks into individual prticles of bitumen uncontaminated by foreign matter and visa versa within the practical allotted time that the pulp is permitted to remain in a conditioning drum.

c. Because of the difficulty noted in b. above, there is formed inside a separation tank a "middling" layer which is believed to consist of relatively small pieces of deposit which contain varying amounts of bitumen and foreign matter. These pieces can run the entire gamut and can contain from between 100 percent to 0 percent bitumen, the remainder being foreign matter of variable density depending upon composition. Thus, they have a specific gravity ranging from that of bitumen to that of foreign matter and consequently form the "middling" layer there-between.

d. The relatively small difference between the specific gravities of bitumen, sand, foreign matter and water inside a separation tank, thereby making gravity separation into the respective components a slow tedious operation. This situation is complicated further by the fact that bitumen normally has a specific gravity greater than that of water. Thus, frothing to reduce the specific gravity of bitumen is a necessity so that it will float on top of water, thereby facilitating its separation from the other components. Those particles of bitumen not affected by frothing sink into the middling layer and require additional costly operations to effect their recovery.

BRIEF SUMMARY OF THE INVENTION

A high velocity stream of a low temperature freezing fluid which consists of a water solution of calcium chloride is used for on site wearing away of a bitumen (heavy oil) deposit, wherein the bitumen is encased or locked in foreign matter. Depending upon the deposit, the foreign matter may be either sand particles or various types of stone and minor materials such as clay.

Depending upon the deposit, the fluid may either be heated to 212° F. to soften bitumen thereby increasing its fluidity and enabling it to separate readily from its foreign matter, or refrigerated to −46° F. to harden bitumen and foreign matter thereby permitting their rapid abrasion. Abrasion particles may be included also in the fluid to accelerate the wearing away of the deposit by either the softening and/or the abrasion process. In addition, the abrasion particles serve to reduce the size of pieces removed from the deposit, the ultimate objective being to obtain individual particles of bitumen uncontaminated by foreign matter and visa versa.

Thereafter, the fluid (which will not freeze at temperatures above −46° F.) serves to convey bitumen, foreign matter and abrasion particles (if used) to a pool from which they are pumped to on site conditioning and separation tanks.

Inside the conditioning tank the components are mixed into a pulp in accordance with presently used procedures. The pulp is then transferred to a separation tank wherein bitumen, fluid, foreign matter and abrasion particles are permitted to separate out in accordance with their specific gravities as before. Frothing of bitumen to reduce its specific gravity is used in accordance with present procedures. However, now the efficiency, speed and thoroughness of separation of bitumen are greatly enhanced by the much smaller size of the pieces of deposit supplied initially to the conditioning tank and the greater likelihood of particles of bitumen uncontaminated by foreign matter and visa versa being supplied. Additionally, bitumen separation is enhanced greatly now because the fluid used has a higher specific gravity than previously used water and bitumen floats on the fluid, even without frothing.

As bitumen has a high viscosity at ordinary temperatures, a portion of fluid from the separation tank is used to transport bitumen to the refinery. Foreign matter and abrasion particles are screened for recycling as abrasion particles and unwanted materials are discarded at an on site tailings pond. A special effort is made to recycle fluid.

The objects of this invention are the following.

a. To eliminate the mechanical problems encountered by bucketwheel excavators and conveyor belts in extracting and transporting bitumen deposits. In addition, to eliminate equipment maintenance problems arising from dry sand particles.

b. To provide a non-freezing (at temperatures above −46° F.) fluid thereby permitting practically year-round outdoor wearing away of a bitumen deposit by either a softening and/or abrasion action of the fluid alone or by abrasion particles added thereto to accelerate the process.

c. To provide a fluid which is capable of either being heated or refrigerated to that temperature which results in the optimum rate of wearing away of the deposit into the desired size pieces or particles.

d. To reduce the size of pieces removed from the deposit with the ultimate objective of obtaining particles of bitumen uncontaminated by foreign matter. These small pieces or particles will contribute toward increasing the speed, efficiency and thoroughness of breakdown into individual particles of bitumen and foreign matter inside the conditioning tank. When transferred to the separation tank they will serve to decrease the magnitude and amount of bitumen in the middling layer, resulting in faster, more efficient and more thorough separation and recovery of bitumen while simultaneously reducing the time and equipment required to effect bitumen recovery.

e. To provide, insofar as possible, on site separation of bitumen from foreign matter, so that only bitumen and fluid required for its transportation are pumped to the refinery, the other materials either being recycled or discarded at the deposit.

f. To provide a fluid capable of carrying year-round bitumen, foreign matter and abrasion particles to an outdoor pool from which they are pumped to on site conditioning and separation equipment, to the refinery, to recycle equipment and/or to the tailings pond.

g. To provide a fluid which has a specific gravity higher than that of bitumen, thereby increasing the speed, efficiency and thoroughness of separation of bitumen from other components in separation equipment.

Further advantageous features and desirable objectives of the subject invention will become apparent from the disclosure and claims which follow.

DETAILED DESCRIPTION OF THE INVENTION

Figure 1:
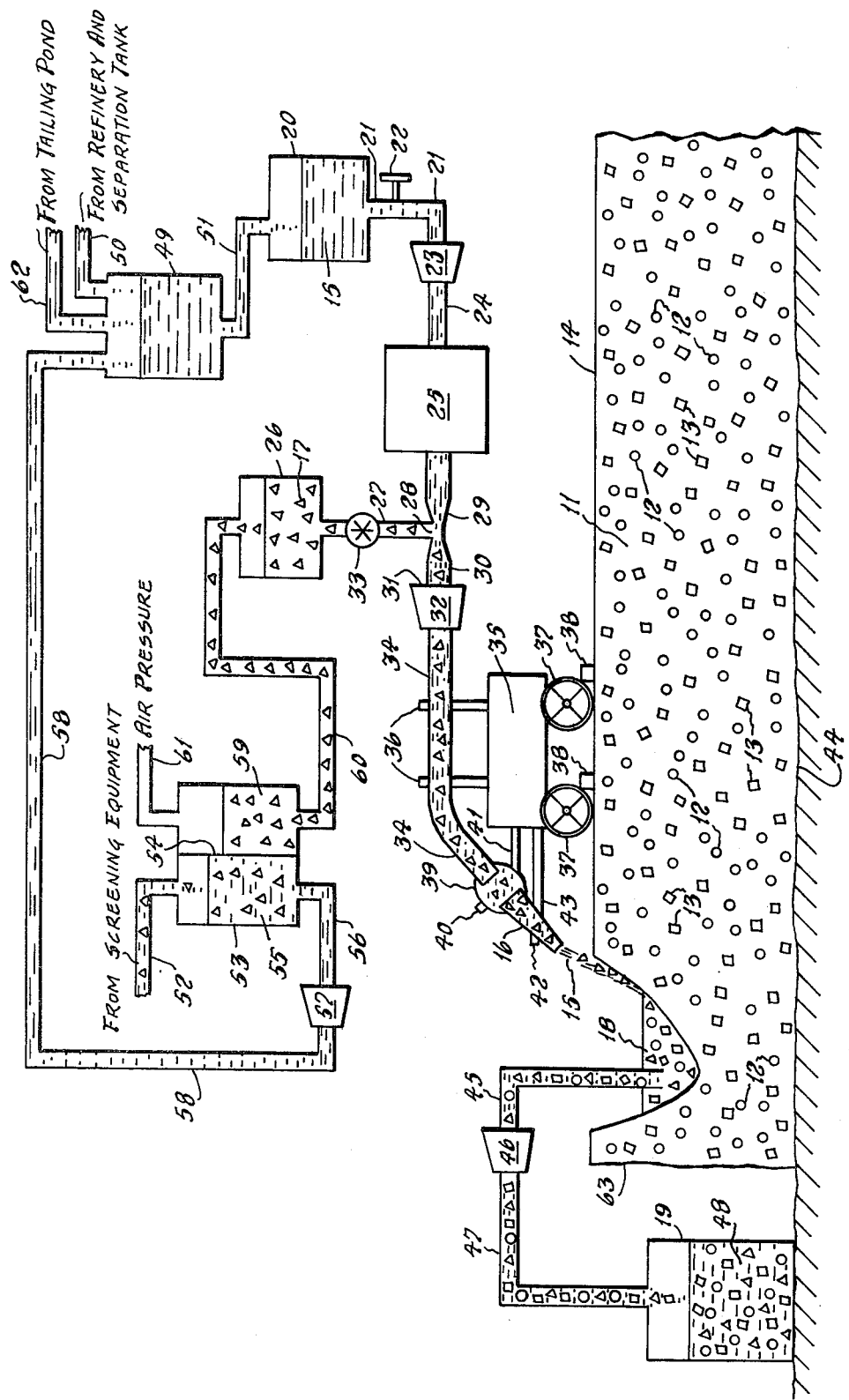
FIG. 1 shows schematically a cross-section of a bitumen deposit 11 wherein particles of bitumen 12 are encased by foreign matter 13. Top surface 14 of the deposit is being worn away by a stream of fluid 15 coming from nozzle 16. Fluid 15 in this instance contains abrasion particles 17. The particles of bitumen and foreign matter removed from the deposit together with fluid and its abrasion particles collect in pool 18 from which they are pumped to conditioning tank 19. Also shown schematically is equipment used for storing, metering, conveying, pumping, heating or refrigerating the fluid and adding abrasion particles thereto, together with means for recycling fluid and abrasion particles.

Shown schematically in FIG. 1 is a cross-section of a bitumen deposit 11 wherein particles of bitumen 12, shown as small circles, are encased by foreign matter 13, shown as small squares. Bitumen deposits found in different parts of the world vary widely, depending upon their origin, formation and age. These deposits contain bitumen encased or locked in foreign matter which depending upon the deposit may consist of sand particles, various types of stone, and minor materials such as clay.

Top surface 14 of the deposit which is on the surface and hence exposed to outdoor temperatures, is shown being worn away by a high velocity stream of fluid 15, shown as small dashed lines, coming from nozzle 16. Fluid 15 consists of a water solution of calcium chloride which depending upon concentration has a freezing point down to −46° F. and a specific gravity higher than that of water. Information regarding the freezing point and specific gravity of solutions having different concentrations of calcium chloride is given in a Table near the end of this section.

Prior to contacting the deposit the fluid may either be heated to a temperature of 212° F. or refrigerated to a temperature of −46° F. This wide temperature range permits selection of the optimum fluid temperature to secure rapid, efficient wearing away of relatively small pieces from deposits having widely different physical properties by either a softening and/or abrasion process. The ultimate objective is to produce, insofar as possible, individual particles of bitumen uncontaminated by foreign matter and visa versa.

When the deposit consists of bitumen (heavy oil) encased in sand particles, the bitumen particles which at ordinary temperatures have too high a viscosity to flow apparently act as a binder or adhesive to hold the sand particles. For such a deposit, fluid 15 is preferably heated to approximately 212° F. prior to contacting the deposit. Then, heat flow from fluid to bitumen particles causes them to soften and reduces their viscosity. When this occurs it increases their fluidity, enabling them to flow assisted by the scouring, abrasive action of the fluid. When the bitumen particles flow, their binding effect on the sand particles is destroyed thereby causing portions of the deposit to disintegrate into relatively small pieces of deposit and possibly particles of bitumen uncontaminated by foreign matter and visa versa. These small pieces and particles are washed away then by fluid 15 to pool 18.

Abrasion particles 17, shown as small triangles, may be added to the fluid even for this type of deposit to utilize the abrasive action of these particles to assist in wearing away smaller size pieces from the deposit. The ultimate objective being to reduce the size of the pieces removed from the deposit to individual particles of bitumen uncontaminated by foreign matter and visa versa. The abrasion particles can be any type of relatively small, stonelike particle which can be carried along by the fluid, such as the sand particles which constitute a large portion of the foreign matter in some of the above-described deposits.

When the deposit consists of bitumen locked in various types of stone, the fluid is preferably refrigerated to approximately −46° F. prior to contacting the deposit and abrasion particles preferably included therein. At ordinary temperatures, bitumen particles in such a deposit, although too viscous to flow readily are still too soft to be abraded readily, absorbing rather than breaking or abrading under the impact energy of the fluid and its abrasion particles. In addition, these bitumen particles provide a cushioning effect for the stone, retarding their rapid abrasion. Contact with very cold fluid hardens the bitumen particles and its stonelike foreign matter making them more prone to abrade rapidly and efficiently into the desired size pieces and individual uncontaminated particles. The abrasion particles used for this type of deposit can either be particles of the stonelike foreign matter abraded from the deposit or any other type of small, hard, abrasive particle which can be carried along by the fluid and separated readily from the other materials present for possible recycling.

However, for both types of deposits, experimentation is required to determine the optimum fluid temperature and the necessity for abrasion particles to wear away year-round by its softening and/or abrasive action the desired size pieces and possibly individual uncontaminated particles from a particular deposit at maximum speed and efficiency.

Fluid 15 at the desired concentration is stored in container 20. From there it is supplied by pipe 21 which contains control valve 22 to regulate fluid flow to pump 23 wherein its pressure is increased. Pipe 24 located at outlet of pump 23 conveys fluid to temperature adjusting facility 25. Depending upon the softening and/or abrasion temperature desired, temperature adjusting facility 25 may be either conventional heating equipment to heat fluid to any desired temperature up to approximately 212° F. or conventional refrigeration equipment to cool fluid to any desired temperature down to −46° F.

Abrasion particles 17, if used, are stored in container 26 and are supplied to fluid 15 by any conventional means used for this purpose; such as an auxiliary pressurized fluid connection (not shown) which picks up the desired amount of abrasion particles 17 and supplies them to the fluid through a connection (not shown) or by pneumatic means (not shown). In FIG. 1, abrasion particles 17 are shown being added by pipe 27 which connects container 26 to opening 28 in venturi portion 29 of pipe 30 which transports the fluid from temperature adjusting facility 25 to inlet end 31 of pump 32. Pipe 27 is equipped with metering device 33 which is operated at a speed to provide the optimum amount of abrasion particles.

Pump 32 increases the pressure of fluid 15 and its abrasion particles 17, if used, and supplies them to one or more lengths of rigid pipe (not shown) and then to flexible pipe 34 mounted on moveable carriage 35 and fastened thereto by clamps 36. Carriage 35 is mounted on wheels 37 or other suitable means to enable it to be moved so that fresh portions of deposit 11 are worn away by the fluid. Wheels 37 are equipped with brakes (not shown) or other convenient means such as blocks 38 so that carriage 35 can resist without moving the reaction force of fluid 15 on nozzle 16.

Flexible pipe 34 is attached to swivel connection 39. This connection is held by clamp 40 which is secured by bracket 41 to carriage 35. The outlet connection (not identified) from swivel 39 is attached to nozzle 16; the arrangement being that the nozzle is free to move horizontally and vertically with fluid 15 passing therethrough while carriage 35 is stationary.

The nozzle is attached by clamp 42 to nozzle positioning arm bracket 43. Bracket 43 is attached to control mechanism (not shown) inside carriage 35 so that nozzle 16 is directed to spray fluid 15 at a gradually increased preselected angle at preselected speed first to one side of the horizontal and then to the other side and at preselected angles to the vertical as directed by a programmed automatic mechanism (not shown) or operator inside carriage 35. This nozzle motion is necessary so that fresh portions of deposit 11 are continually exposed to the fluid to replace those worn and washed away by the fluid. The horizontal and vertical angles through which nozzle 16 are moved are those at which a portion of the deposit can be worn away with optimum speed, efficiency and economy. Following this, carriage 35 is moved to a new position and the operation repeated.

Fluid 15 also serves to wash the pieces and particles removed from the deposit and its abrasion particles into pool 18 which is located outdoors and hence exposed to outdoor temperatures (shown in FIG. 1 as being located in a depression worn in top surface 14). However, pool 18 can be positioned at any convenient location to which fluid 15 can be guided to flow by gravity at sufficient velocity to transport all the pieces and particles involved to any suitable depression, even one (not shown) located in base 44 of the deposit.

When fluid 15 is concentrated to contain 30 parts (by weight) of calcium chloride in 100 parts of solution, it has a freezing point of $-46°$ F. Thus, fluid 15 will not freeze at temperatures above $-46°$ F. and will thus run freely and be liquid inside pool 18 at practically all times during the year, even when the deposit is located in a normally cold region.

Suction pipe 45, which is flexible so that it can be moved from pool to pool as new portions of the deposit are worn away, is positioned below the top surface of pool 18. The suction pipe transports the contents of the pool which consists of a mixture of fluid 15, relatively small pieces of deposit 11, possibly individual particles of bitumen 12 and foreign matter 13 together with abrasion particles 17 to pump 46 wherein the pressure of the mixture is increased. Pipe 47 located at the outlet of pump 46 is used to transport the mixture to an on site conditioning tank 19. Although only one conditioning tank is shown in FIG. 1, depending upon the production rate desired there may be several such tanks in practice.

Conditioning tank 19 is of the conventional type currently in use wherein steam and hot water are added and the mixture converted into pulp 48 wherein the pieces of deposit supplied are disintegrated, insofar as possible, into particles of bitumen uncontaminated by foreign matter and visa versa. However, now it is anticipated that the speed, efficiency and thoroughness of this reduction to individual particles is accelerated greatly because of the much smaller size of the pieces of deposit 11 now supplied and the far greater likelihood of individual uncontaminated particles being supplied initially. Pulp 48 also contains abrasion particles 17, if used.

From conditioning tank 19, pulp 48 is supplied by pipe (not shown) to any one of a number of on site conventional separation tanks (not shown) such as those now in use wherein the components are permitted to settle out in accordance with their respective specific gravities. However, now the need for frothing to reduce the specific gravity of the bitumen particles so that they would rise to the surface for separation is diminished because bitumen which has a specific gravity of about 1.02 will rise normally to the surface when mixed with fluid 15 which has a specific gravity at 60° F. of 1.287 (when concentrated to 30 parts of calcium chloride in 100 parts of fluid). Although not essential now, frothing will continue to be used to accelerate the natural tendency which exists now for bitumen to rise to the surface, thereby increasing the speed, efficiency and thoroughness of its separation from the other components.

In addition, the speed, efficiency and thoroughness of separation of bitumen from the other components are greatly increased also because of the far greater number of uncontaminated particles being furnished from the conditioning tank. These uncontaminated particles greatly reduce the magnitude and hence the amount of bitumen in the "middling" layer which existed previously. This middling layer probably consisted of small pieces of the deposit containing lower density frothed bitumen particles contaminated with adhered heavy density foreign matter, and possibly unfrothed particles of bitumen. These pieces, being neither frothed bitumen or foreign matter consequently formed a middle layer there-between as they had a specific gravity which ranged the entire gamut from that of frothed bitumen to that of foreign matter depending upon the type and amount of foreign matter contamination. As the middling layer which existed previously contained a considerable amount of bitumen, additional recovery steps were necessary to effect its recovery.

However, in view of the information above it is expected now that the size and magnitude of the middling layer and hence the amount of bitumen contained therein are reduced greatly. Because of this reduction, it is conceivable that further costly operations to recover bitumen from this layer may not be warranted. A decision in this matter is dependent upon economic considerations, such as the value of bitumen recovered for the expense involved.

After standing for a suitable period of time, the materials present in the separation tank segregate themselves into layers as follows. Bitumen having the lowest specific gravity of 1.02 (or less following frothing) on top, followed by a layer of fluid 15 having a specific gravity of 1.287 (when a 30 part calcium chloride solution is used). The fluid layer may contain a small amount of middlings. Following this there is a very much smaller middling layer than previously which contains bitumen contaminated with varying amounts of foreign matter and having a specific gravity ranging from that of the fluid to that of the foreign matter, and the usually heavier foreign matter and abrasion particles on bottom. Bitumen, fluid, middlings, foreign matter and abrasion particles are removed from the separation tank in accordance with normally used procedures.

Since bitumen at ordinary outdoor temperatures has too high a viscosity to be pumped through a pipe, it is combined or emulsified with a portion of fluid removed from the tank using on site equipment (not shown) customarily used for this purpose. The combined bitumen and fluid are pumped through a pipe (not shown) to the refinery (not shown). Inside the refinery, the components are separated using conventional means (not shown) and the bitumen upgraded to synthetic crude oil.

Fluid separated from bitumen at the refinery and the excess fluid from the separation tank are returned for recycling to on site fluid concentration adjustment tank 49 by pipe 50 (only the terminal end of which is shown in FIG. 1). Inside this tank the concentration of the fluid is monitored continuously and adjusted to that desired. If too concentrated, the required amount of water is added by a pipe (not shown) and if too dilute either additional calcium chloride is added (by means not shown) or excess water boiled off by steam or electrical facilities (not shown). When the fluid is at the desired concentration it is supplied by pipe 51 to container 20 to be recycled.

The middling layer is disposed of in accordance with economic considerations which depend upon the value of bitumen contained and the expense involved in its recovery. If, as expected now, the amount of bitumen contained in this layer is relatively small and recovery uneconomical, it is disposed of in the same manner as unwanted foreign matter. If recovery is desired one option is to employ on site secondary recovery techniques (not shown) such as those used now. However, using the present invention another option is offered wherein the middling layer is recycled and the bitumen contaminated particles permitted to break down into individual uncontaminated particles by a repetition of the entire softening and/or abrasion process followed by a further breakdown into individual particles in a conditioning tank. Similarly, it is anticipated that any middlings retained by the fluid removed from the separation tank will also be broken down into individual particles of bitumen and foreign matter when the fluid is recycled.

If secondary bitumen recovery equipment is used, the bitumen, fluid and foreign matter obtained from the middling layer is combined with and disposed of in the same manner as the comparable materials obtained from the separation tank.

Foreign matter 13 removed from the separation tank is transported by another portion of fluid also removed from the tank to be screened and graded by equipment (not shown). Those particles to be recycled are transported by the fluid through pipe 52 (only the terminal end of which is shown in FIG. 1) to abrasion particle reconditioning tank 53. This tank is divided into two portions by barrier 54. In portion 55, abrasion particles are washed and the resulting fluid together with that used for transporting the particles drained into pipe 56. This pipe conveys the combined fluid to pump 57 wherein the pressure is increased and then they are conveyed by pipe 58 to fluid concentration adjustment tank 49 also. In portion 59 (of abrasion particle reconditioning tank 53), abrasion particles 17 are dried first by steam or electrical means (not shown). Then they are transported by pipe 60 to container 26 for recycling using any suitable means normally used for this purpose, such as pneumatic air pressure supplied by pipe 61 from a source (not shown).

The unwanted foreign matter removed from the separation tank and/or the screening equipment is transported by a pipe (not shown) by still another portion of fluid (also removed from the separation tank) and disposed of at an on site tailings pond (not shown). A special effort is made to wash as much fluid as possible from the tailings pond. The fluid washed from this pond is returned to fluid concentration adjustment tank 49 by pipe 62 (only the terminal end of which is shown in FIG. 1.)

However, if as anticipated, the wearing away of the deposit by the softening and/or abrasion techniques described herein results in a sufficiently large number of individual uncontaminated bitumen particles which are easily separated from the other materials present, it may be possible to dispense with the conditioning tank and furnish the abraded and abrasion materials directly to an on site separation tank. In fact, it may even be possible to provide for true on site bitumen separation by dispensing also with the separation tank and supplying all the materials directly to a large on site tailings pond. The bitumen which now normally floats on the fluid without frothing will be skimmed off the surface of the pond. The fluid if any, are drained from the pond for recycling and, if required, abrasion particles are removed also for recycling. These latter operations may be conducted outdoors practically year-round in most regions because of the extremely low freezing point (−46° F.) of suitably concentrated fluid.

In FIG. 1 there is shown a single nozzle wearing away top surface 14 of deposit 11 with pool 18 in which the materials collect also located in top surface 14. However, in actual practice, to increase production, multiple nozzles mounted on carriage 35 or additional carriages may be used. In addition, nozzles can be arranged to wear away front 63 of deposit 11 as well as its back (not shown) and sides (not shown). Regardless of where the wearing away process occurs, the abraded and abrasion materials can be guided to one or more pools (not shown) located in deposit 11 or base 44 and pumped from there to whatever separation means are used. Furthermore, this softening and/or abrasion process is not intended to replace, but to supplement the presently used bucketwheel or other extraction process so that the end results is an increased rate of extraction of bitumin from the deposit.

Fluid 15, as noted previously, is based on water solutions of calcium chloride which depending upon concentration have a freezing point down to −46° F. and a specific gravity greater than that of water and bitumen. For example, when concentrated to 30 parts of calcium chloride (by weight) in 100 parts of the solution, fluid 15 has a freezing point of −46° F. and a specific gravity at 60° F. of 1.287. Thus, at this concentration, fluid 15 will not freeze until the outdoor temperature falls below −46° F., which seldom occurs even during midwinter in very cold regions. Thus at this concentration fluid 15 permits:

a. Year-round outdoor wearing away of bitumen deposits by its softening and/or abrasion process.

b. Its use as a non-freezing vehicle to transport the abraded and abrasion materials to an outdoor pool wherein the fluid will maintain its fluidity practically year-round thereby permitting the contents of the pool to be pumped to conditioning and/or separation equipment.

c. The use of above ground pipes with practically no insulation to be used to transport the abraded and abrasion materials to the nozzle, to the conditioning and separation equipment, to the refinery and to recycle equipment.

As it may be desired to use fluid 15 at different concentrations, information regarding the effect of variation of its concentration in parts of calcium chloride (by weight) in 100 parts of the solution on its specific gravity at 60° F., weight per cubic foot and freezing point is contained in a table which follows. This table is extracted from a more complete one published in page 2166 of MECHANICAL ENGINEERS' HANDBOOK by Mr. Lionel S. Marks, Fourth Edition, Copyright 1941 by McGraw-Hill Book Company, Inc. Used with permission of McGraw-Hill Book Company, Inc.

Table

| Properties of Calcium Chloride Solutions | | | |
|---|---|---|---|
| Concentration, Parts of Calcium Chloride by weight in 100 parts of the solution | Specific gravity at 60° F. | Weight per cu ft, lb | Freezing point, deg F. |
| 6 | 1.050 | 65.52 | 28.0 |
| 8 | 1.069 | 66.70 | 24.2 |
| 10 | 1.087 | 67.83 | 21.4 |
| 12 | 1.105 | 68.95 | 18.2 |
| 14 | 1.124 | 70.08 | 14.4 |
| 16 | 1.143 | 71.26 | 9.9 |
| 18 | 1.162 | 72.51 | 4.7 |
| 20 | 1.182 | 73.63 | −1.0 |
| 22 | 1.202 | 75.0 | −7.3 |
| 24 | 1.223 | 76.32 | −14.1 |
| 26 | 1.244 | 77.56 | −22.0 |
| 28 | 1.265 | 78.94 | −32.0 |

Table-continued

| Properties of Calcium Chloride Solutions | | | |
|---|---|---|---|
| Concentration, Parts of Calcium Chloride by weight in 100 parts of the solution | Specific gravity at 60° F. | Weight per cu ft, lb | Freezing point, deg F. |
| 30 | 1.287 | 80.35 | −46.0 |

Since very concentrated solutions of fluid 15 at very low temperatures may cause calcium chloride to be deposited on the interior walls of pipes and vessels, it may be desirable during warmer weather to use less concentrated solutions to redissolve deposited calcium chloride. However, in this regard it is important to recall that the more concentrated the fluid the greater the difference between its specific gravity and that of bitimin, and hence the greater the natural tendency for bitumen to rise to the surface and to be separated from the other materials present.

MODE OF OPERATION OF INVENTION

To select the parameters for the best mode of operation of the invention, a specific bitumen deposit of known properties must be selected first.

The site selected for this purpose is the tar sands deposit located along the banks of the Athabaska River in Alberta, Canada. This deposit according to information contained in pages 167-170 "From ASPHALTS AND ALLIED SUBSTANCES, vol. 1, 6th ed., by H. Abraham, copyright 1960 by Litton Educational Publishing, Inc., Reprinted by permission of Van Nostrand Reinhold Company" is described as follows: "The deposit varies in thickness to a maximum of 225 ft. The material contains 12 to 20 percent asphalt, averaging between 15 and 18 percent, associated with an unconsolidated sand consisting of between 93 and 99 percent pure silica. A marked variation in the size of the sand grains is characteristic of almost every exposed section of the deposit, ranging from 40 to 80 mesh. The asphalt is amenable to the water extraction process." A specimen of the extracted asphalt examined by the author tested as follows:

| | |
|---|---|
| Specific gravity at 77° F. | 1.022 |
| Penetration at 77° F. | Too soft for test |
| Penetration at 32° F. | 120 |

Note: The above tabulated data is just a partial extraction of more extensive data on the properties of the extracted asphalt provided by the author.

However, it should be noted that the selected best mode of operation may not be suitable for another bitumen deposit located in a different region. The bitumen in different deposits vary widely in their physical and chemical properties, being affected greatly by age, origin and weathering. In addition, the foreign matter associated with bitumen in deposits also vary widely in amount, composition and physical properties and can range from unconsolidated silica sand particles noted above to various types of stone and clay. Information regarding the properties of different bitumen deposits found at different locations is contained in the above-mentioned book by Mr. Abraham.

For the above-mentioned Athabaska tar sands deposit which is currently being exploited commercially, the following parameters are selected:

a. Type and concentration of fluid

The fluid consists of a water solution of calcium chloride containing 30 parts (by weight) of calcium chloride in 100 parts of the solution. When this concentrated, the fluid has a freezing point of −46° F. and thus will seldom, if ever, freeze solidly despite being exposed to outdoor winter temperatures in Alberta, Canada. Furthermore, at this concentration, the fluid has a specific gravity of 1.287, much higher than that of bitumen, thereby facilitating rapid, efficient and thorough separation of bitumen from the other components present in separation equipment. Frothing of bitumen in accordance with presently used procedures will be continued, thereby accelerating still further the tendency of bitumen to rise to the surface for separation from other components. The fluid used to transport bitumen to the refinery, abrasion particles to be screened and recycled, foreign matter to be discarded in the tailings pond and any remaining fluid removed from the separation tank is recycled.

b. Temperature of fluid leaving nozzle

Since bitumen in this deposit is amenable to the water extraction process, a relatively high temperature of approximately 212° F. is selected for the fluid exiting from the nozzle to contact the deposit. Fluid at this temperature will provide heat to the bitumen particles thereby raising their temperature. As the temperature of the bitumen particles is increased they tend to soften. This causes the viscosity of these particles to be reduced with a consequent increase in their fluidity. The impact energy of the high velocity stream of fluid and its abrasion particles causes these softened particles to flow and hence separate from the deposit. This separation action is encouraged and assisted materially by the scouring, abrasive action of the fluid and its abrasion particles which flow past these softened particles at high velocity. When the bitumen particles separate from the deposit their binding effect on the unconsolidated sand particles is reduced materially, causing portions of the deposit to disintegrate into relatively small pieces and possibly into a large number of bitumen particles uncontaminated by foreign matter and visa versa.

c. Pressure of fluid prior to entering nozzle

A pressure of between 50 and 100 pounds per sq in. is selected for the fluid entering the nozzle. At these pressures, assuming zero friction in the nozzle, the fluid exits from the nozzle at a velocity of between 86 and 123 ft per second, respectively. This relatively high velocity is intended to provide the abrasive, scouring effect to reinforce the softening effect of the fluid noted previously to cause the deposit to disintegrate into relatively small pieces and uncontaminated particles. These pieces and particles are carried along then by the high velocity fluid to a pool from which they are pumped to on site conditioning and separation equipment.

d. Use of abrasion particles

Abrasion particles are added to the fluid prior to its contacting the deposit to assist in reducing the size of the pieces and increasing the number of individual uncontaminated particles of bitumen and foreign matter removed therefrom.

e. Type of abrasion particles

The unconsolidated silica sand particles which constitute over 90 percent of the foreign matter in this deposit are used as the abrasion particles. Eliminated by this expedient is the necessity to import, possibly at high cost, a special purpose material for this purpose. Also eliminated is the additional expense in separating the special purpose material from the foreign matter for recycling. Thus, there is provided at the deposit site an unlimited supply of abrasion particles. Recycling is accomplished readily as the only difference between abrasion particles and foreign matter is the small amount of impurities present in foreign matter which can be removed readily by screening and grading equipment.

f. Amount of abrasion particles added to fluid

This amount is best determined by experimentation to achieve optimum, rapid, efficient wearing away of very small pieces and the largest possible number of uncontaminated bitumen and foreign matter particles from the deposit. Thus, the amount of abrasion particles added can vary widely, depending upon such diverse variables as outdoor temperature conditions, specific gravity of fluid used and the size of the sand particles in the foreign matter. Tentatively, the amount selected is in the range of 20 to 50 percent of the combined weight of fluid and abrasion particles added, with 30 percent selected at the outset.

g. Sizes and materials used for the nozzle, pipes, hoses, pumps, metering devices and temperature adjusting facility All of these ancillary components must be sized properly to deliver the desired amount of fluid and abrasion particles to the nozzle at the desired pressure. In addition, those components which come in contact with abraded or abrasion particles must either be inherently abrasion resistant or suitably protected.

h. Location of abrasion site

Tentatively, the fluid (together with its abrasion particles) will be used to wear away a portion of the top surface of the deposit with the pool into which the materials collect also located therein. However, a faster, more economical and efficient rate of production may be achieved by simultaneously wearing away the deposit sides and ends; particularly, if these surfaces are exposed. When this occurs, the pool or pools in which the materials collect are located at intermediate levels or in the deposit base.

i. Angle of incidence of fluid

An angle of 45 degrees downward is selected initially when the fluid is used to wear away the top surface, with the nozzle designed to swivel 30 degrees to both sides. However, these angles as well as those used when the fluid is used to wear away the sides and ends of the deposit are subject to refinements as experimentation is conducted to determine the conditions required to achieve optimum wearing away of the deposit into the desired size pieces and particles.

j. Conditioning tank

For the present, it is proposed to transport the fluid, its abrasion particles and the pieces and particles removed from the deposit to an on site conventional conditioning tank. Therein, conventional procedures will be used to convert the components into a pulp, breaking down the pieces removed from the deposit into uncontaminated particles of bitumen and foreign matter, insofar as possible.

k. Separation tank

Tentatively, it is proposed to transfer the pulp from the conditioning tank to an on site conventional separation tank. Therein the components will be permitted to separate out into the respective components using equipment and procedures currently used for this purpose; including frothing to accelerate the rise of bitumen particles to the surface. However, the procedures described in the above disclosure have significant advantageous features compared with those currently used. For example, the wearing away of portions of the deposits by the softening and/or abrasive action of the fluid and its abrasion particles results in much smaller size pieces and possibly a very large number of individual particles of bitumen uncontaminated by foreign matter and visa versa. Previously, relatively large chunks were extracted by the bucketwheel teeth and it was difficult, if not impossible, to break these large chunks down into uncontaminated particles within practical time restraints. In addition, the fluid used now has a specific gravity much higher than that of bitumen and water, thereby permitting bitumen to rise normally to the surface for separation even without frothing, whereas formerly the specific gravity of bitumen was lower than that of water and separation more difficult. Because of these advantageous features it may be possible now to dispense with the conditioning tank and to supply the materials from a pool directly to an on site separation tank. In fact, such a large number of uncontaminated particles of bitumen may be produced by the fluid that it may be possible now to dispense with both the conditioning and separation tanks and obtain a sufficiently high rate of bitumen recovery when the materials from the pool are transported directly to a large on site tailings pond. Bitumen which floats normally on the fluid would rise to the surface of this tailings pond and be separated therefrom. The fluid is washed and drained then from the pond to be recycled, the required abrasion particles removed for recycling and the remaining unwanted foreign matter merely left in the condition "as is" in the pond; thereby providing a modified version of in situ bitumen recovery. Tailings pond separation of bitumen may be economically feasible in view of the high rate of bitumen recovery expected and the tremendously reduced amount of equipment required to effect its recovery. This can lead to a greatly increased rate of production with the expenditure of comparatively little capital investment. Concurrently, it is anticipated that there will be a significant savings in heat and electrical energy currently required to extract bitumen from the sands at the desired recovery rate. The above noted tailings pond separation method is feasible year-round because of the very low freezing temperature of properly concentrated fluid.

l. Middlings

If a separation tank is used, the middling layer removed therefrom is added to fluid prior to a nozzle. Then, the shearing action due to turbulent flow inside pipes and nozzle coupled with the softening effect of high temperature fluid tend to break down the middlings into uncontaminated particles of bitumen and foreign matter. This breakdown is enhanced greatly when middlings contact the deposit at high velocity on exiting from the nozzle and then again when they are recycled through the conditioning and separation tanks. Once broken down, bitumen and foreign matter in the middlings are removed from the separation tank in the same manner as these materials are normally removed therefrom. Any middlings carried along by the fluid will similarly be broken down into individual uncontaminated particles when the fluid is recycled. When the amount of bitumen contained in the middling layer becomes relatively insignificant, as anticipated using the above-described fluid and procedures, and the expense involved in its recovery becomes unwarranted, tailings pond separation becomes more practical.

Examination of the disclosure indicates that the objectives noted in the summary of the invention have been achieved in that the fluid and new procedures disclosed eliminate mechanical problems with bucket-wheel excavators, conveyor belts and maintenance problems arising from dry sand particles; provide a fluid suitable for year-round use which is capable of being heated or refrigerated to obtain optimum wearing away of the deposit by its softening and/or abrasion action to remove smaller pieces and the largest possible number of individual particles of bitumen and foreign matter; reduce the size and amount of bitumen in the middling layer; provide for on site separation and recovery of bitumen; and accelerate the speed, efficiency and thoroughness of separation of bitumen from other components because of the higher specific gravity of the fluid. In fact, the new process makes practical a modified version of in situ recovery of bitumen wherein bitumen is separated from a tailings pond.

It is understood that various modifications may be made in the above disclosure without affecting its scope or intent of providing a high velocity stream of a fluid with or without abrasion particles to wear away by its softening and/or abrasive action relatively small pieces and possibly individual uncontaminated particles of bitumen and foreign matter from a bitumen deposit; such as the use of the fluid at different concentrations, different fluids including possibly water under certain conditions despite its relatively high freezing temperature and low specific gravity compared to a properly concentrated calcium chloride solution, different collection and different separation procedures including pumping the contents of the outdoor pool either to on site conditioning and/or separation tanks or to the refinery for separation into components, and using commercial grades of calcium chloride containing some impurities to prepare the fluid solutions.

What is claimed is:

1. A method for use in abrading and recovering bitumen (heavy oil) particles from a bitumen containing deposit which is on the surface and hence exposed to outdoor temperatures and in which said bitumen particles are encased by sand particles, stone or other foreign matter; said method comprising:

a. spraying a low temperature freezing fluid onto the exposed surface, thereby abrading away particles of said deposit, said bitumen, said sand, said stone and said foreign matter by the scouring, abrasive action of the fluid on the deposit;
   b. washing said particles of deposit, bitumen, sand, stone and foreign matter by said fluid into an outdoor pool, the contents of which are exposed to outdoor temperatures;
   c. pumping the contents of said outdoor pool to separation equipment to recover bitumen from said deposit.

2. The method as recited in claim 1 wherein the low temperature freezing fluid contains a concentration of from 6 to 30 parts of calcium chloride by weight in 100 parts of a water solution and has a corresponding freezing point ranging from $+28°$ F. down to $-46°$ F. and a corresponding specific gravity ranging from 1.050 to 1.287.

3. The method as recited in claim 2 wherein the fluid is either heated or refrigerated to a specified temperature within the range of $+212°$ F. and $-46°$ F., to optimize the fluid temperature at which the maximum number of uncontaminated bitumin particles are abraded from the deposit.

4. The method as recited in claim 2 wherein sand or stone particles are added to the fluid to abrade the maximum number of uncontaminated bitumen particles from the deposit.

5. The method as recited in claim 1 wherein the bitumen particles are encased by unconsolidated sand particles, such as that of the Athabaska tar sands in Alberta, Canada.

6. The method as recited in claim 1 wherein the bitumen particles are encased in various types of stone.

7. The method as recited in claim 1 wherein the middlings removed from the separation equipment are broken down into particles of bitumen and particles of sand, stone and other foreign matter by recycling the middlings through the fluid spraying equipment.

8. The method as recited in claim 1 wherein the separation equipment consists of an outdoor tailings pond wherein the bitumen, fluid, sand, stone and foreign matter are permitted to separate out in accordance with their respective gravities.

* * * * *